(12) United States Patent
Mora (10) Patent No.: US 10,918,079 B1
(45) Date of Patent: Feb. 16, 2021

(54) PET BOWL LIFT APPARATUS

(71) Applicant: Gabriel A. Mora, Cooper City, FL (US)

(72) Inventor: Gabriel A. Mora, Cooper City, FL (US)

( * ) Notice: Subject to any disclaimer, the term of this patent is extended or adjusted under 35 U.S.C. 154(b) by 511 days.

(21) Appl. No.: 15/382,826

(22) Filed: Dec. 19, 2016

(51) Int. Cl.
| | |
|---|---|
| *A01K 5/00* | (2006.01) |
| *A01K 5/01* | (2006.01) |
| *A47B 9/16* | (2006.01) |
| *A47B 13/16* | (2006.01) |
| *F16M 11/18* | (2006.01) |
| *F16M 11/38* | (2006.01) |
| *A01K 7/00* | (2006.01) |
| *A01K 29/00* | (2006.01) |
| *F16H 21/44* | (2006.01) |
| *F16H 25/20* | (2006.01) |
| *G08C 17/02* | (2006.01) |

(52) U.S. Cl.
CPC .......... *A01K 5/0135* (2013.01); *A01K 7/005* (2013.01); *A01K 29/00* (2013.01); *A47B 9/16* (2013.01); *A47B 13/16* (2013.01); *F16H 21/44* (2013.01); *F16H 25/20* (2013.01); *F16M 11/18* (2013.01); *F16M 11/38* (2013.01); *F16H 2025/2043* (2013.01); *F16H 2025/2081* (2013.01); *G08C 17/02* (2013.01)

(58) Field of Classification Search
CPC .. A01K 5/0114; A01K 5/0142; A01K 5/0135; A01K 5/02; A01K 7/00; A01K 7/005; A01K 7/02; A47B 9/16; A47B 9/12; A47B 13/08; A47B 13/081; A47B 13/16
See application file for complete search history.

(56) References Cited

U.S. PATENT DOCUMENTS

| | | | | |
|---|---|---|---|---|
| 2,805,905 A | * | 9/1957 | Levitan .................. | A47B 31/00 108/145 |
| 3,203,670 A | * | 8/1965 | Farris .................... | B66F 7/0666 108/120 |
| 3,700,070 A | * | 10/1972 | King ..................... | B66F 11/042 108/145 |
| 3,796,282 A | * | 3/1974 | Denier .................. | B66F 11/042 108/145 |
| 4,232,901 A | * | 11/1980 | Harrington .......... | A47C 16/025 108/147 |

(Continued)

*Primary Examiner* — Son T Nguyen
(74) *Attorney, Agent, or Firm* — Glenn E. Gold, P.A.; Glenn E. Gold (57) ABSTRACT

A pet bowl lift apparatus includes a tray for holding at least one pet bowl and a lift mechanism supported on ground level, detachably supporting the tray upon and above the lift mechanism, and being vertically movable between collapsed and extended states. The lift apparatus also includes a lift control mechanism operable to actuate the lift mechanism between the collapsed and extended states to elevate the tray from proximate the ground level to different elevations above the ground level to enable a person without bending to replace and remove the tray on and from the lift mechanism and to accommodate at the different elevations pets of different sizes. The lift apparatus further includes an outer accordion tubular casing enclosing the lift mechanism and vertically moved between recoiled and extended states by actuation of the lift mechanism between the collapsed and extended states.

15 Claims, 9 Drawing Sheets

(56) References Cited

U.S. PATENT DOCUMENTS

| | | | | |
|---|---|---|---|---|
| 4,712,653 | A * | 12/1987 | Franklin | B66F 7/08 |
| | | | | 108/145 |
| D302,618 | S * | 8/1989 | Gottselig | D34/23 |
| 4,926,760 | A * | 5/1990 | Sack | B65G 1/07 |
| | | | | 108/145 |
| 5,000,124 | A | 3/1991 | Bergen | |
| 5,002,293 | A * | 3/1991 | Gottselig | B62B 3/02 |
| | | | | 108/145 |
| 5,054,431 | A | 10/1991 | Coviello | |
| 5,476,050 | A * | 12/1995 | Zimmer | B66F 11/042 |
| | | | | 100/147 |
| 5,584,263 | A | 12/1996 | Sexton | |
| 7,318,391 | B2 | 1/2008 | Brillon | |
| 7,383,786 | B2 * | 6/2008 | Giannasca | B63B 17/0081 |
| | | | | 108/144.11 |
| 7,677,518 | B2 * | 3/2010 | Chouinard | A47B 21/02 |
| | | | | 108/10 |
| 7,938,083 | B1 * | 5/2011 | Huether | A01K 5/0114 |
| | | | | 119/61.5 |
| 8,082,883 | B2 | 12/2011 | Aletti | |
| 8,776,725 | B1 | 7/2014 | Grijalva | |
| 9,144,225 | B1 | 9/2015 | Gaccione et al. | |
| 9,635,929 | B1 * | 5/2017 | Wu | A47B 9/16 |
| 9,670,039 | B1 * | 6/2017 | Enochs | B66F 7/0666 |
| D836,206 | S * | 12/2018 | Pettinato | D24/185 |
| 2013/0145972 | A1 * | 6/2013 | Knox | B60N 3/063 |
| | | | | 108/145 |
| 2014/0360411 | A1 * | 12/2014 | Hatter | A47B 9/18 |
| | | | | 108/28 |
| 2016/0120301 | A1 * | 5/2016 | Cross | A47B 13/003 |
| | | | | 320/101 |
| 2017/0196351 | A1 * | 7/2017 | Failing | A47B 21/02 |
| 2018/0055214 | A1 * | 3/2018 | Kim | A47B 9/10 |
| 2018/0084903 | A1 * | 3/2018 | Liao | A47B 9/16 |
| 2018/0146775 | A1 * | 5/2018 | You | A47B 9/16 |

* cited by examiner

PET BOWL LIFT APPARATUS

FIELD OF THE INVENTION

The present invention relates to pet feeder accessories, and, more particularly, is concerned with a pet bowl lift apparatus.

BACKGROUND OF THE INVENTION

Many persons encounter considerable difficulty feeding their pets. Particularly the elderly with limited mobility or limited bending capability find it a daily struggle to bend down in order to place food and water bowls for their pets on the floor. Accidental spilling of pet food and water during bending results in additional unavoidable work to clean up the mess.

Even when the bowls have been successfully placed on the floor without spilling their food and water, they still remain vulnerable to spillage due to accidental collisions with the bowls by the pet or pets and/or the pet owner. The likelihood of food or water spillage may vary depending on the different sizes of pets.

A pet bowl elevating apparatus has been proposed in the prior art that raise and lowers a bowl support platform along a vertical guide column of a fixed height that extends from the pet owner's waist to the floor. The bowl support platform may be raised or lowered by rotating a vertical screw thread shaft mounted to the vertical column, or driving a conveyor belt on pulleys or a drive chain on sprockets supported by the vertical guide column. The fixed height of the vertical guide column results in an overall unsightly and ungainly apparatus.

Accordingly, there remains a need in the art for an innovation that will overcome deficiencies and problems that remain unsolved.

SUMMARY OF THE INVENTION

The present invention is directed to an innovation that overcomes the deficiencies of the known art and the problems that remain unsolved by providing a pet bowl lift apparatus.

In one aspect of the present invention, a pet bowl lift apparatus includes:
  a tray for holding at least one pet bowl;
  a lift mechanism supported on a ground level and detachably supporting the tray upon and above the lift mechanism, the lift mechanism being vertically movable between collapsed and extended states;
  a lift control mechanism operable to actuate the lift mechanism to vertically move between the collapsed and extended states and raise the tray from proximate the ground level to different elevations above the ground level to enable a person without bending to replace and remove the tray on and from the lift mechanism and to accommodate at the different elevations pets of different sizes; and
  an outer tubular casing attached at an upper end thereof to the tray and surrounding and enclosing the lift mechanism at ground level and at the different elevations above ground level as the outer tubular casing is vertically moved between recoiled and extended states by the actuation of the lift mechanism between the collapsed and extended states.

In another aspect of the present invention, the lift mechanism includes a scissor lift assembly, the scissor lift assembly including first and second pluralities of paired parallel legs wherein the paired parallel legs of the first plurality thereof are pivotally coupled together end-to-end by first connectors and the paired parallel legs of the second plurality thereof are pivotally coupled together end-to-end by second connectors such that the first and second pluralities of paired parallel legs are arranged in respective zigzag configurations that criss-cross, and interfit with, one another. The first and second pluralities of paired parallel legs also are pivotally coupled together by middle connectors located midway between opposite ends of the paired parallel legs such that the interfitted and pivotally coupled first and second pluralities of paired parallel legs provide a scissoring action when the scissor lift assembly undergoes vertical movement between the collapsed and extended states. The first, second and middle connectors define respective pivotal axes that extend parallel with one another.

In another aspect of the present invention, a pet bowl lift apparatus includes:
  a tray for holding at least one pet bowl;
  a lift mechanism including
    an upper plate disposed below the tray and detachably supporting the tray,
    a lower base displaced below the upper plate and resting on ground level, and
    a scissor lift assembly disposed between, and terminating at, the lower base and the upper plate, the scissor lift assembly including
      a pair of upper ends,
      a pair of upper end connectors each laterally spaced from the other and disposed on a respective one of the upper ends, the upper end connectors pivotally coupled to and supporting the upper plate,
      a pair of lower ends, and
      a pair of lower end connectors each laterally spaced from the other and disposed on a respective one of the lower ends and being pivotally coupled to and supported on the lower base such that the scissor lift assembly is operable to vertically move the upper plate toward and away from the lower base;
  a lift control mechanism drivingly coupled to the lower end connectors of the scissor lift assembly for actuating the scissor lift assembly to vertically move the upper plate and the tray therewith, relative to the lower base at ground level, between a fully raised elevation to enable a person without bending to remove and replace the tray and a succession of different elevations below the fully raised elevation and above or at ground level corresponding to varying pet sizes for accessing the at least one bowl; and
  an outer tubular casing attached at an upper end thereof to the tray and surrounding and enclosing the lift mechanism at ground level and at the different elevations above ground level as the outer tubular casing is vertically moved between extended and recoiled states to accommodate the tray being disposed at the correspondingly raised and successively lowered elevations above and at ground level.

In another aspect of the present invention, the tray includes an upper platform having an opening for seating at least one pet bowl, a perimeter wall attached to and extending about and below a periphery of the upper platform so as to define a cavity below the upper platform in which the pet bowl extends, and a lower platform spaced below the upper platform and disposed within and peripherally attached to the perimeter wall so as to overlie and fit onto the upper plate of the lift mechanism such that the upper plate detachably supports the tray. The tray has a plurality of spaced apart first alignment elements on the lower platform of the tray. The upper plate of the lift mechanism has a plurality of second alignment elements on the upper plate that align, and releasably interfit, with the first alignment elements of the lower platform of the tray.

In another aspect of the present invention, a pet bowl lift apparatus includes:
- a tray for holding at least one pet bowl;
- a lift mechanism supported on a ground level and detachably supporting said tray upon and above said lift mechanism, said lift mechanism being vertically movable between collapsed and extended states, said lift mechanism including
  - a scissor lift assembly adapted to undergoing vertical movement between said collapsed and extended states, said scissor lift assembly including
    - a pair of upper ends,
    - a pair of upper end connectors each laterally spaced from the other and disposed on a respective one of said upper ends,
    - a pair of lower ends, and
    - a pair of lower end connectors each laterally spaced from the other and disposed on a respective one of said lower ends,
  - an upper plate disposed above the scissor lift assembly, the upper plate having
    - an upper plate connector attached on a bottom of said upper plate adjacent to a first side edge of said plate and pivotally coupled with one of the upper end connectors of the pair thereof of the scissor lift assembly,
    - an upper guide track attached on the bottom of the upper plate laterally spaced from the upper plate connector and extending adjacent to a second side edge of the upper plate opposite to the first side edge thereof, and
    - an upper guide shoe pivotally coupled with the other of the upper end connectors of the pair thereof of the scissor lift assembly, the upper guide shoe disposed in a horizontal sliding engagement with the upper guide track to enable horizontal sliding movement of the one upper end of the scissor lift assembly along the upper guide track and thereby accommodate vertical movement of the scissor lift assembly between the collapsed and extended states, and
  - a lower base disposed below the scissor lift assembly, the lower base having
    - a lower base connector attached on a top of the lower base adjacent to a first side edge of the lower base and pivotally coupled with one of the lower end connectors of the pair thereof of the scissor lift assembly,
    - a lower guide track attached on the top of the lower base laterally spaced from the lower base connector and extending adjacent to a second side edge of the lower base opposite to the first side edge thereof; and
    - a lower guide shoe pivotally coupled with the other of the lower end connectors of the pair thereof of the scissor lift assembly, the lower guide shoe disposed in a horizontal sliding engagement with the lower guide track to enable horizontal sliding movement of the one lower end of the scissor lift assembly along the lower guide track and thereby enable vertical movement of the scissor lift assembly between the collapsed and extended states;
- a lift control mechanism operable to actuate the lift mechanism to vertically move between the collapsed and extended states and raise the tray from proximate the ground level to different elevations above the ground level to enable a person without bending to replace and remove the tray on and from the lift mechanism and to accommodate at the different elevations pets of different sizes, the lift control mechanism including
  - a gear box supporting the lower base connector on the top of the lower base,
  - a reversible drive motor supported by the gear box adjacent to the lower base connector,
  - an elongated drive screw supported by the gear box adjacent to the lower base connector and the reversible drive motor, the elongated drive screw at one end drivingly connected to the reversible drive motor and extending therefrom to an opposite end threadably connected to the lower guide shoe on the lower base such that actuation of the reversible drive motor causes reversible rotation of the elongated drive screw relative to the lower guide shoe and thus reversible horizontal movement of the lower guide shoe along and relative to the lower guide track on the lower base, thereby enabling reversible vertical movement of the scissor lift assembly between the collapsed and extended states; and
  - a wireless device configured to control operation of the reversible drive motor; and
- an outer tubular casing at an upper end thereof attached to the tray and surrounding and enclosing the lift mechanism at ground level and at the different elevations above ground level as the outer tubular casing is vertically moved with an accordion action between recoiled and extended states by the actuation of the lift mechanism between the collapsed and extended states.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-4, there is illustrated an exemplary embodiment of a pet bowl lift apparatus, generally designated 100, in accordance with aspects of the present invention. The pet bowl lift apparatus 100 basically includes a tray 102, a lift mechanism 104, a lift control mechanism 106, and an outer tubular sleeve or casing 108. The tray 102 of the lift apparatus 10, which may be fabricated from a suitable metal or plastic material, holds at least one pet bowl 110. In the illustrated embodiment, the tray 102 includes an upper platform 112 having a pair of openings 114 for seating a pair of pet bowls 110, one being food and the other for water. The tray 102 also includes a perimeter wall 116 attached to and extending about and below a periphery of the upper platform 112 so as to define a cavity 118 below the upper platform. The bottoms of the pet bowls 110 extend downward into the cavity 118. The tray 102 further includes a lower platform 120 spaced below the upper platform 112 and disposed within and peripherally attached to the perimeter wall 116. The lower platform 120 has an oval-shaped opening 122 extending between opposite side edges of the lower platform, as best shown in FIGS. 3 and 5-7, allowing space for non-interference between the lower platform and the bottoms of the pet bowls 110.

Figure 1:
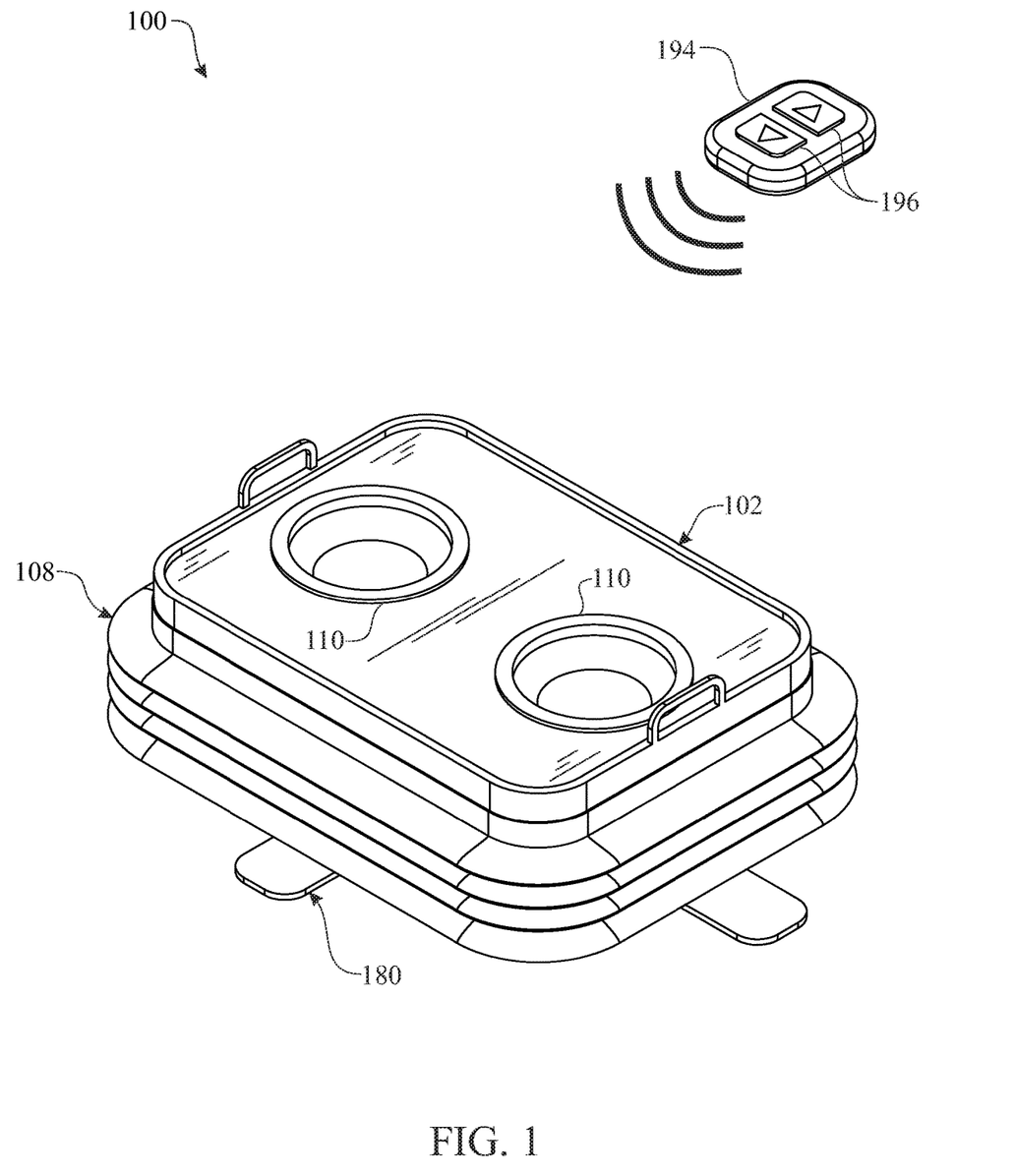
FIG. 1 presents an upper isometric assembled view of an exemplary embodiment of a pet bowl lift apparatus in accordance with aspects of the present invention.
Figure 5:
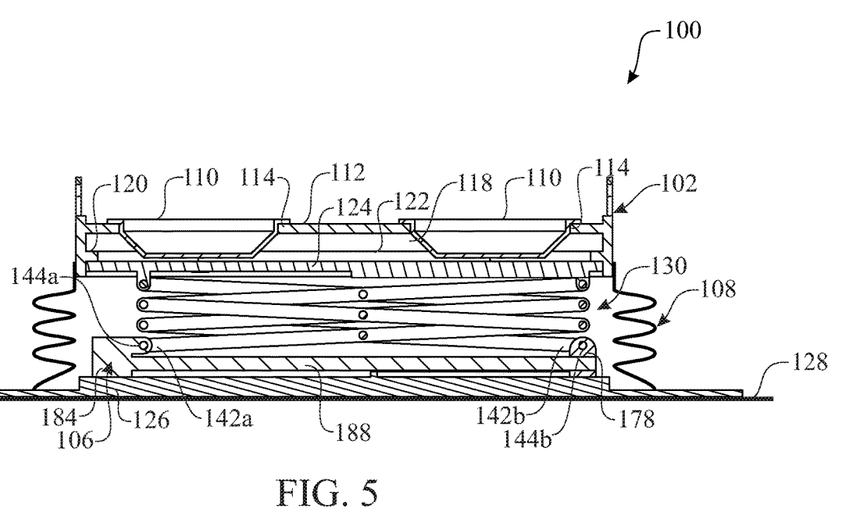
FIG. 5 presents a sectional view of the lift apparatus taken along section line 5-5 in FIG. 1, illustrating the lift mechanism in a collapsed state and an outer tubular casing enclosing the lift mechanism being in a recoiled state.
Figure 6:
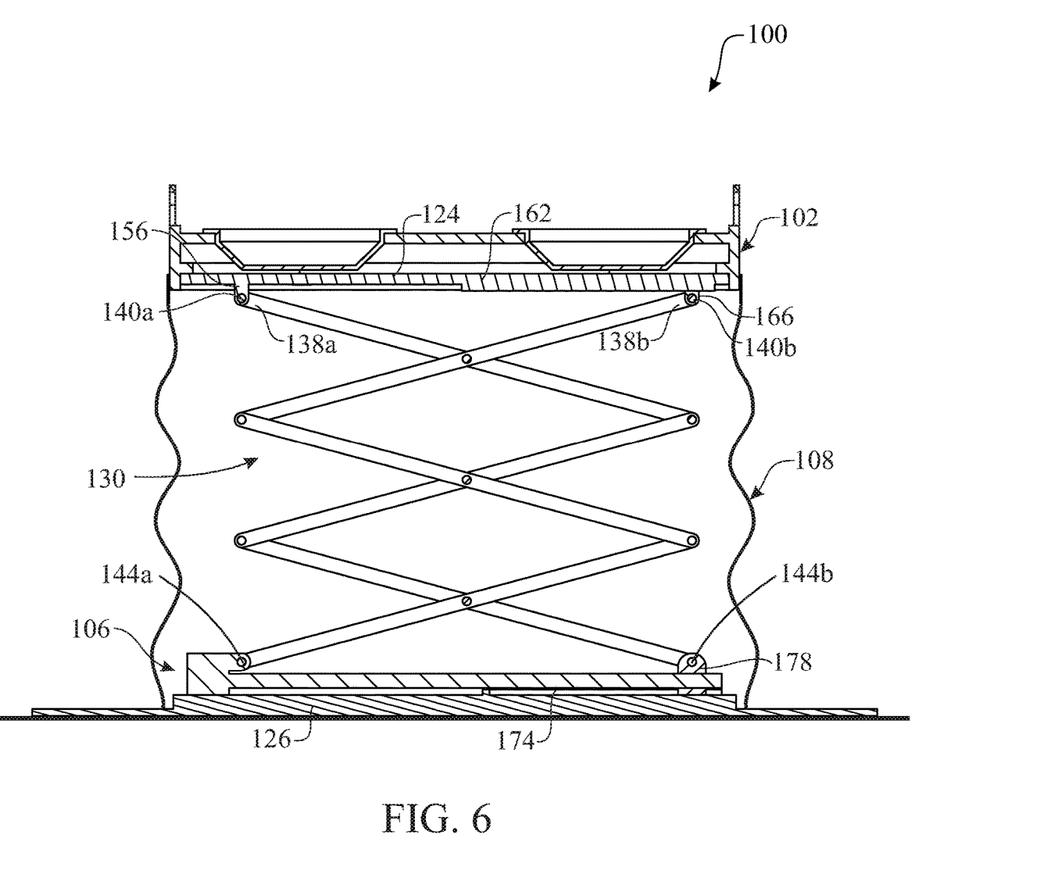
FIG. 6 presents another sectional view of the lift apparatus similar to FIG. 5, now illustrating the lift mechanism in a partially extended state and the outer tubular casing in a partially extended state.
Figure 7:
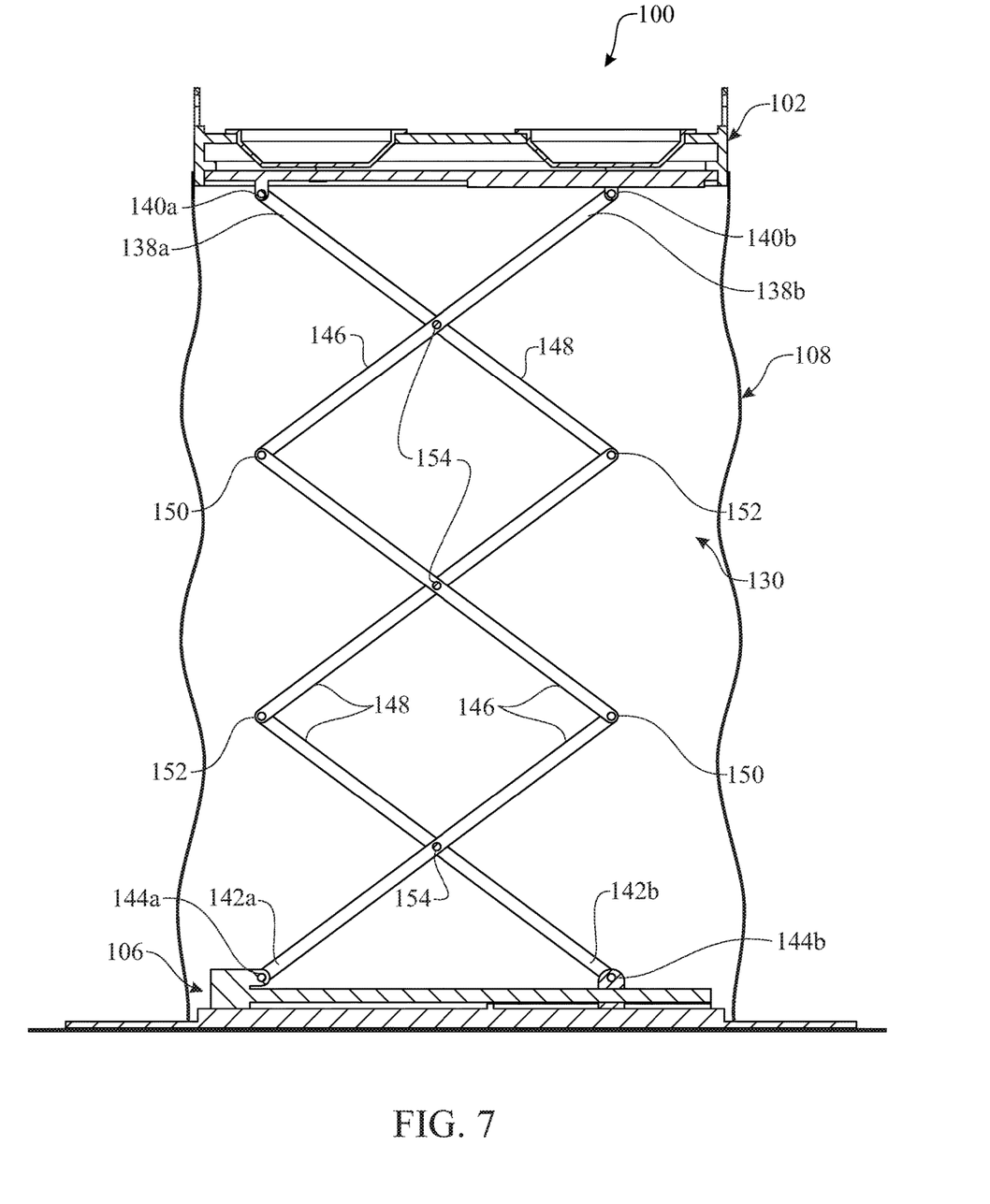
FIG. 7 presents yet another sectional view of the lift apparatus similar to FIGS. 5 and 6, now illustrating the lift mechanism in an extended state and the outer tubular casing in an extended state.

The lift mechanism 104 of the lift apparatus 100 is movable between a collapsed state, as best shown in FIGS. 1 and 5, and various degrees of an extended state, as best shown in FIGS. 6 and 7. Specifically, lift mechanism 104 is shown in a fully collapsed state in FIG. 5, in a partially-extended state in FIG. 6, and in a fully-extended state in FIG. 7. More particularly, the lift mechanism 104 includes an upper plate 124 disposed below the tray 102 and detachably supporting the tray, a lower base 126 located below the upper plate 124 and resting on ground, or floor, level 128, and a scissor lift assembly 130 interconnecting the lower base 126 and the upper plate 124. The scissor lift assembly 130 is adapted to undergo vertical extension between the collapsed (FIG. 5) and extended (FIGS. 6-7) states. As is clearly shown in the drawings, during use of the fully-assembled pet bowl lift apparatus 100, upper plate 124 remains horizontally oriented and parallel to base plate 126, as upper plate 124 is restricted against any pivoting motion due to the coupling of leftmost upper end 138a and upper plate connector 156, in concert with the corresponding slidable coupling of guide shoe 166 to the upper plate 124, and more particularly to upper plate guide track 162. In other words, the horizontally-oriented upper plate 124 remains non-pivotable from its horizontal orientation when the pet bowl lift apparatus 100 is in a fully-assembled, operational state. The components of the lift mechanism 104 may be fabricated from a suitable metal or plastic material.

Figure 2:
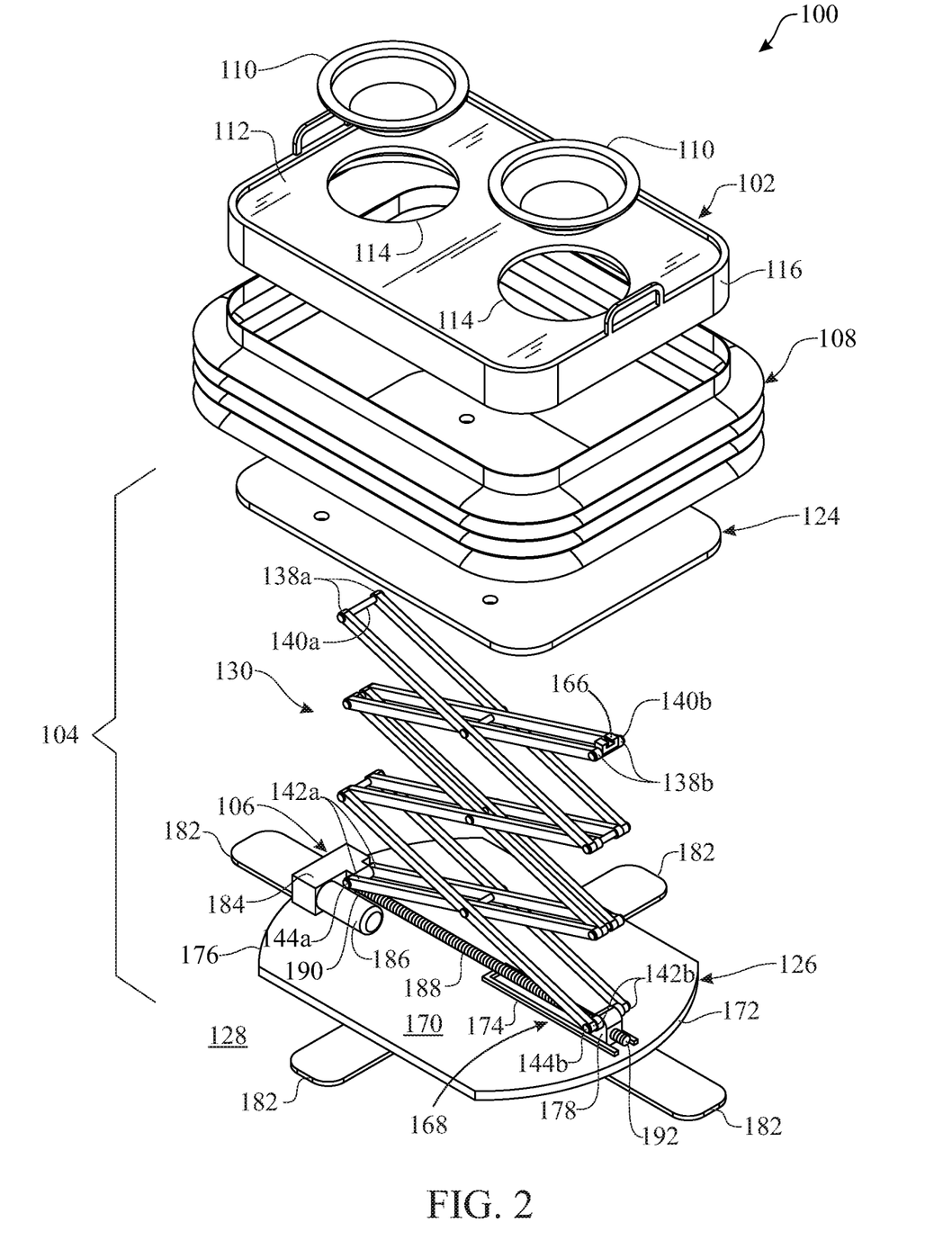
FIG. 2 presents an upper isometric exploded view of the lift apparatus originally introduced in FIG. 1.
Figure 3:
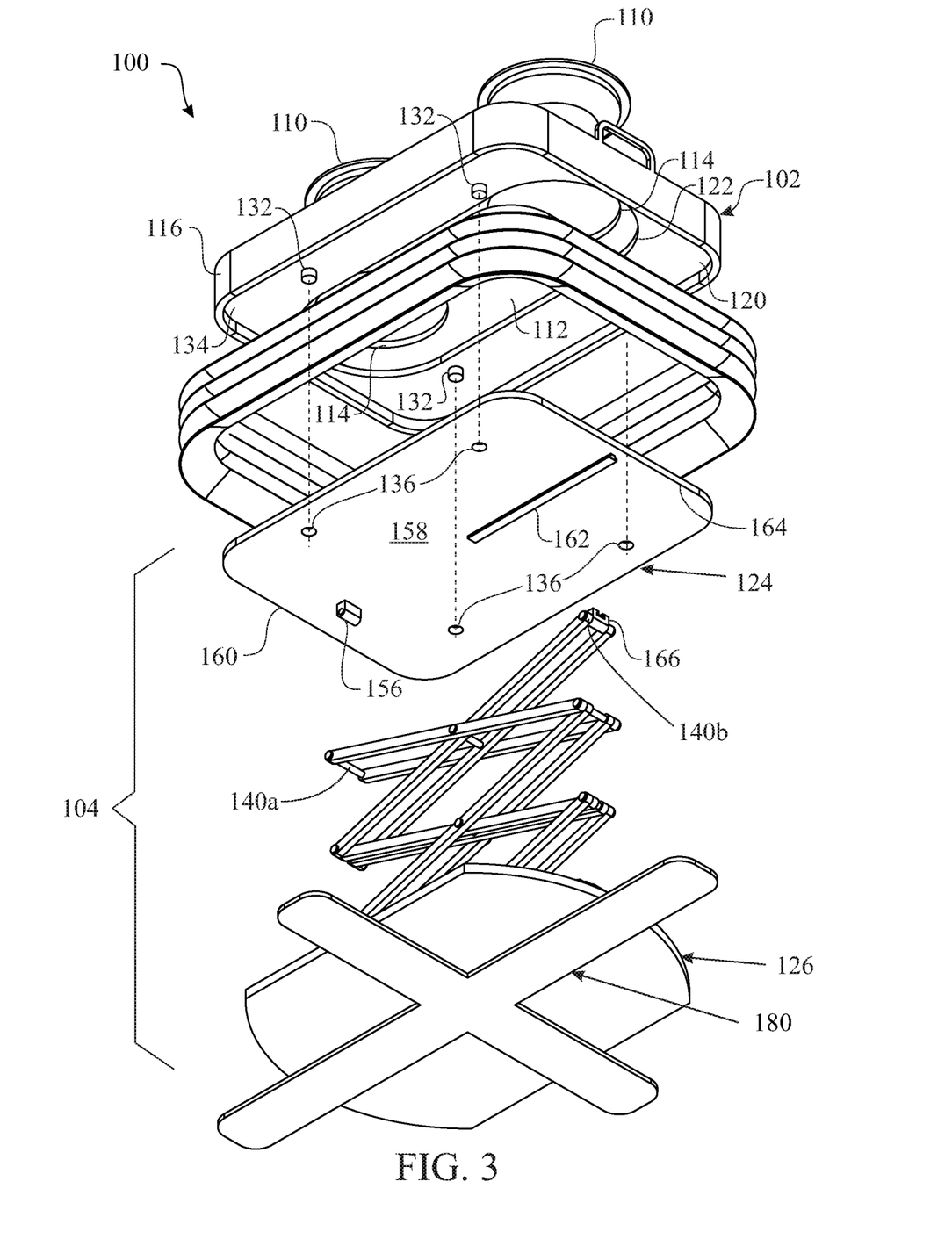
FIG. 3 presents a lower isometric exploded view of the lift apparatus originally introduced in FIG. 1.

The lower platform 120 of the tray 102 overlies and fits onto the upper plate 124 of the lift mechanism 104 such that the upper plate detachably supports the tray. More particularly, as best seen in FIGS. 2 and 3, the lower platform 120 of the tray 102 has a plurality of spaced apart first alignment elements 132, such as in the form of downwardly-protruding pegs, defined on a bottom 134 of the lower platform 120. The upper plate 124 of the lift mechanism 104 has a plurality of second alignment elements 136, such as apertures, defined in the upper plate 124 such that they align, and releasably interfit, with the first alignment elements 132 on the bottom 134 of the lower platform 120 of the tray 102 such that the tray is detachable from the upper plate and thus from the rest of the lift apparatus 100 for ease of washing and doing other tasks without disturbing the rest of the apparatus.

More particularly, as best seen in FIGS. 2-7, the scissor lift assembly 130 of the lift mechanism 104 includes a pair of upper ends 138 and a pair of upper end connectors 140 each laterally spaced from the other and disposed on a respective one of the upper ends 138. The upper end connectors 140 are pivotally coupled to and support the upper plate 124 of the lift mechanism 104. The scissor lift assembly 130 also includes a pair of lower ends 142 and a pair of lower end connectors 144 each laterally spaced from the other and disposed on a respective one of the lower ends 142. The lower end connectors 144 are pivotally coupled to and supported on the lower base 126 of the lift mechanism 104 such that the scissor lift assembly 130 is operable to vertically move the upper plate 124 toward and away from the lower base 126.

As best seen in FIGS. 2, 3 and 5-7, the scissor lift assembly 130 also includes first and second pluralities of paired parallel legs 146, 148 having the pair of upper ends 138 with the upper end connectors 140 and the pair of lower ends 142 with the lower end connectors 144. Also, the paired parallel legs 146 of the first plurality thereof are pivotally coupled together end-to-end by first connectors 150, whereas the paired parallel legs 148 of the second plurality thereof are pivotally coupled together end-to-end by second connectors 152. Further, the first and second pluralities of paired parallel legs 146, 148 are separately arranged in respective zigzag configurations that criss-cross, and interfit with, one another and are pivotally coupled together by middle connectors 154 located midway between opposite ends of the paired parallel legs 146, 148 such that the interfitted and pivotally coupled first and second pluralities of paired parallel legs provide a scissoring action when the scissor lift assembly 130 undergoes movement between the collapsed and extended states, as seen in FIGS. 5-7. The first, second and middle connectors 150, 152, 154 define respective pivotal axes that extend parallel with one another.

Figure 4:
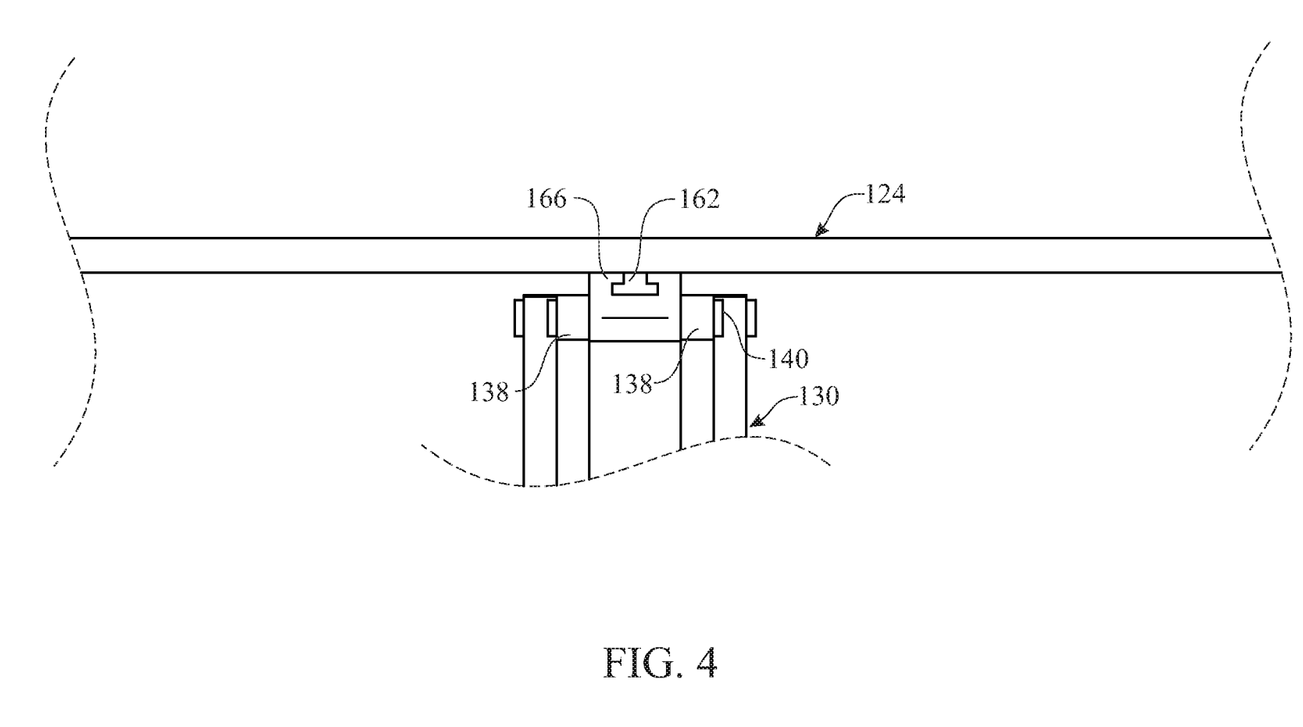
FIG. 4 presents an enlarged fragmentary side elevation view of the lift apparatus, illustrating a slide connection between components of a lift mechanism of the lift apparatus.

More particularly, as best seen in FIGS. 3-7, the upper plate 124 of the lift mechanism 104 has an upper plate connector 156 attached on a bottom 158 of the upper plate adjacent to a first side edge 160 thereof and pivotally coupled with a leftmost one (140a) of the upper end connectors 140 of the pair thereof of the scissor lift assembly 130. As shown in FIG. 4, the upper plate 124 also has an upper guide track 162 attached on the bottom 158 of the upper plate laterally spaced from the upper plate connector 156 and extending adjacent to a second side edge 164 of the upper plate opposite to the first side edge 160 thereof, and an upper guide shoe 166 pivotally coupled with the other a rightmost one (140b) of the upper end connectors 140 of the pair thereof of the scissor lift assembly 130. The upper guide shoe 166 is disposed in a horizontal sliding engagement with the upper guide track 162 to enable horizontal sliding movement of the rightmost one (138b) of the upper end 138 of the scissor lift assembly 130 along the upper guide track 162 and thereby accommodate vertical movement of the scissor lift assembly between the collapsed and extended states. Referring particularly to FIGS. 2-3, in this manner, pivoting of upper plate 124 about the leftmost upper end connector 140a extending through upper plate connector 156 (FIG. 3) is restricted by the corresponding coupling of opposite rightmost upper end connector 140b, via upper guide shoe 166, to upper guide track 162. Likewise, pivoting of upper plate 124 about rightmost upper end connector 140b is restricted by the corresponding coupling of leftmost upper end connector 140a to upper plate connector 156.

As best seen in FIGS. 2 and 5-7, the lower base 126 of the lift mechanism 104 has a lower base connector 168, or connection subassembly, disposed on a top 170, or upper surface, of the lower base adjacent to a first side edge 172 thereof and pivotally coupled with lower end connector 144b (FIG. 3) of the scissor lift assembly 130. Moreover, as described in greater detail below, oppositely located lower end connector 144a (FIG. 3) is pivotally coupled to the lift control mechanism 106 disposed on upper surface 170 of the lower base 126 adjacent to a second side edge 176 thereof. The lower base 126 has a lower guide track 174 disposed upon upper surface 170 of the lower base 126 laterally spaced from the lower base connector 168 and extending adjacent to opposite, second side edge 176 of the lower base. The lower base connection subassembly 168 includes a lower guide shoe 178 pivotally coupled with lower end connector 144b of the scissor lift assembly 130. The lower guide shoe 178 is disposed in a horizontal sliding engagement with the lower guide track 174 to enable horizontal sliding movement of lower end 142a of the scissor lift assembly 130 along the lower guide track 174, and to thereby enable vertical extension of the scissor lift assembly between the collapsed (FIG. 5) and extended (FIGS. 6-7) states. The lower base 126 may have a supplemental bottom cross-shaped structure 180 thereon, with its ends 182 extending beyond the periphery of the lower base 126 to provide increased stability to the lift apparatus 100.

Figure 8:
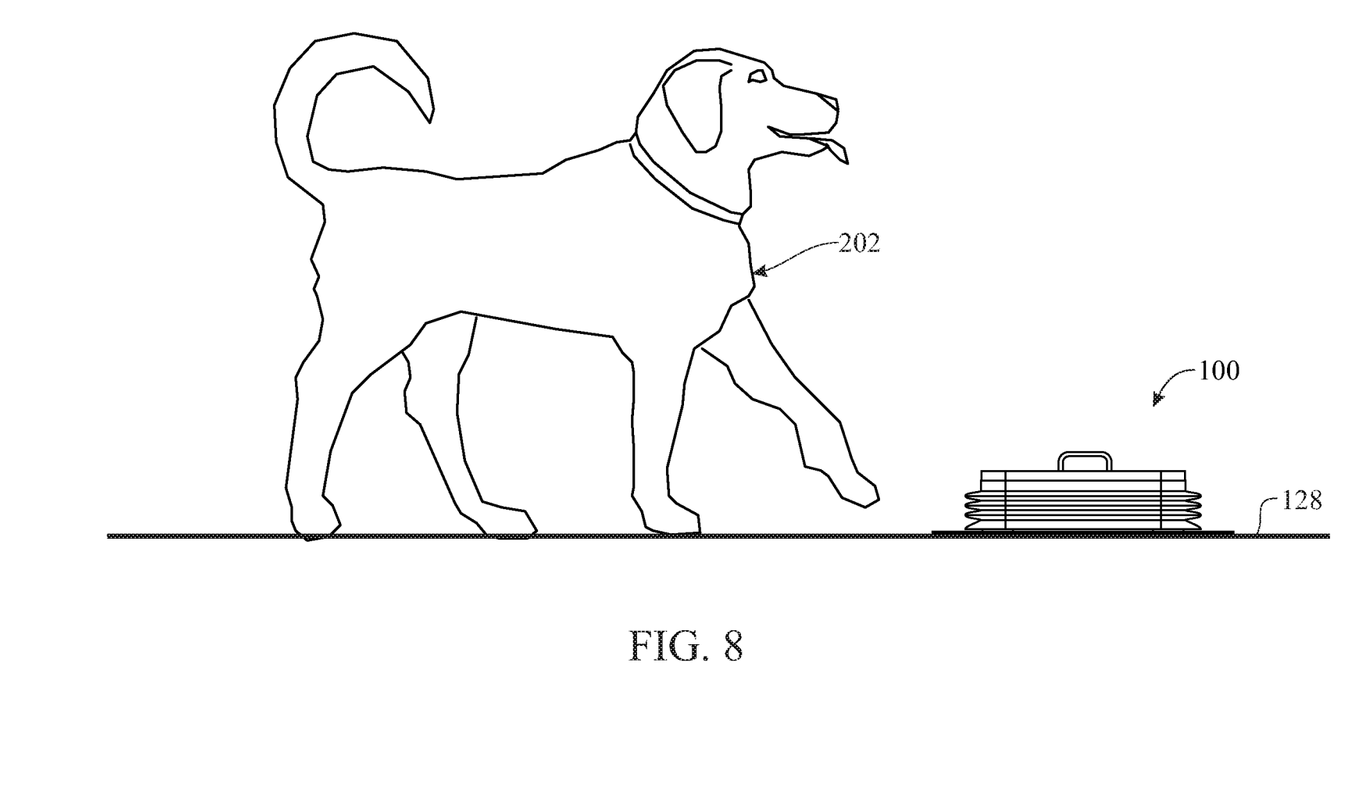
FIG. 8 presents a pet awaiting arrival of feeding time when the lift apparatus will be used.

The lift control mechanism 106 of the lift apparatus 100 is operable to actuate the lift mechanism 104 between the collapsed and expanded states to elevate the tray 102 from proximate the ground, or floor, level 128 to different heights above the ground level to enable a person without bending to replace and remove the tray 102 on and from the lift mechanism 104 and also to accommodate at the different heights pets of different sizes, one example of a pet 202 being depicted in FIG. 8. More particularly, as best seen in FIG. 2, the lift control mechanism 106 includes a gear box 184 supporting the lower base connector 168 and a reversible drive motor 186 adjacent to the lower base connector 168. The lift control mechanism 106 also includes an elongated drive screw 188 supported by the gear box 184 adjacent to the lower base connector 168 and the reversible drive motor 186. The elongated drive screw 188 at one end 190 is drivingly connected to the reversible drive motor 186 and extends therefrom to an opposite end 192 along an axis of rotation that extends perpendicular to the respective parallel-extending pivotal axes of the first, second and middle connectors 150, 152, 154 that provide the scissoring action when the scissor lift assembly 130 undergoes vertical movement between the collapsed and extended states. At the opposite end 192 the elongated drive screw 188 is threadably connected to the lower guide shoe 178 such that actuation of the reversible drive motor 186 causes reversible rotation of the elongated drive screw 188 relative to the lower guide shoe 178 and thus reversible horizontal movement of the lower guide shoe 178 along and relative to the lower guide track 174, thereby enabling reversible vertical movement of the scissor lift assembly 130 between the collapsed and extended states.

Figure 9:
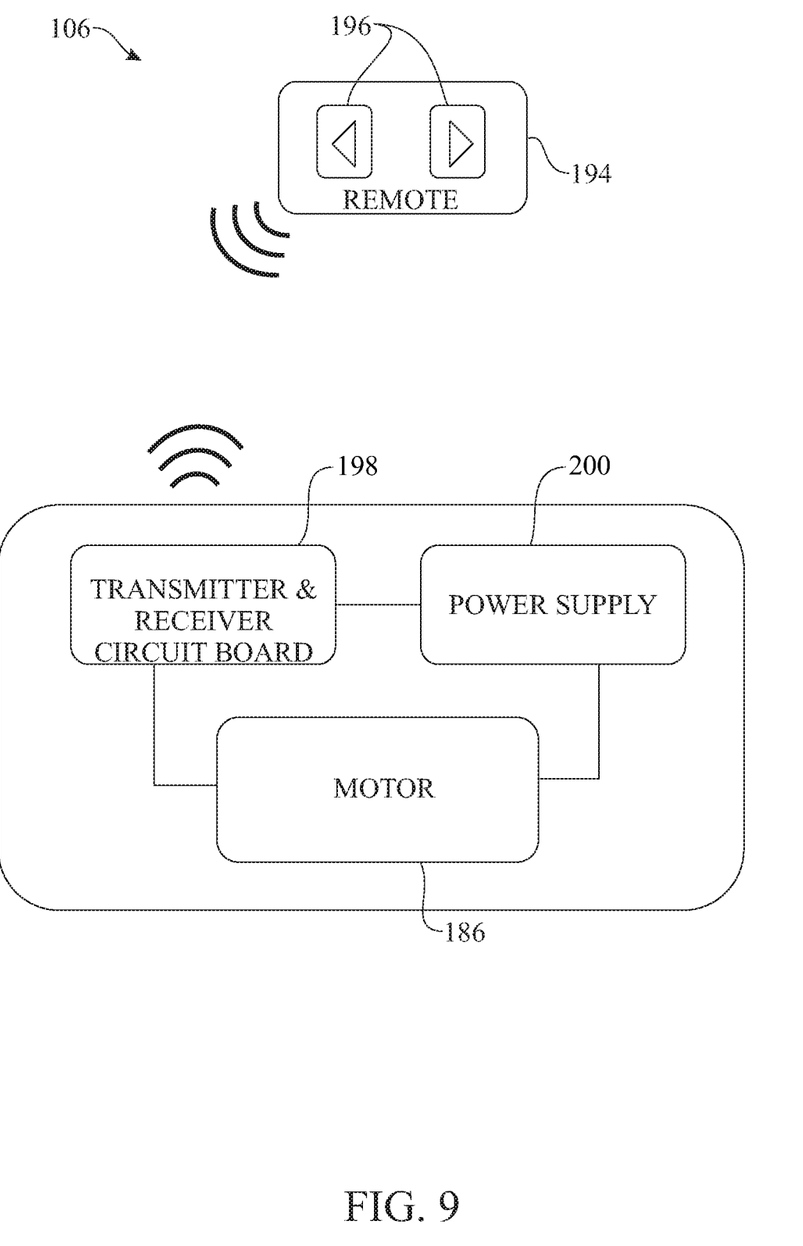
FIG. 9 presents a block diagram of a system of electrical components used to actuate operation of the lift mechanism of the lift apparatus.

As seen in FIGS. 1 and 9, the lift control mechanism 106 also includes a remote control device 194 configured with a pair of buttons 196 to control directional operation of the reversible drive motor 186 of the lift control mechanism 106. The remote control device 194 may wirelessly communicate with a transmitter & receiver circuit board 198 connected in a circuit with a power supply 200 and the reversible drive motor 186. After the user has placed food and/or water in the bowl or bowls at waist level, an appropriate one of the buttons 196 on the remote control device 194 may be pressed to electronically actuate the reversible drive motor 186 to lower the tray with the bowls 110 down to the desired level for the pet to feed and drink. As mentioned above, the tray 102 may be stopped at different heights above the ground or floor level 128 for varying pet sizes. This can also prevent ants from getting into the food. The remote control device 194 of the lift control mechanism 106 alternatively may be a foot-pedal operated control device, in place of the wireless control device, which is connected by wires to the reversible drive motor 186.

The outer sleeve or casing 108 surrounds the lift mechanism 104 so as to enclose all of the interior moving components of the lift mechanism. The outer tubular casing 108 is movable between recoiled and extended states, as seen in FIGS. 5-7, by actuation of the lift mechanism 104 between the collapsed and extended states. More particularly, the outer casing 108 may be a tubular fabric cover having a plurality of circumferentially-spaced apart pleated folds exhibiting an accordion action movable between the recoiled and extended states as the lift mechanism 104 is actuated between the collapsed and extended states. The accordion outer casing will be fully extended when the tray is fully raised to waist level and fully recoiled when the tray is fully down to the ground or floor level. The accordion outer casing may be made of materials similar to accordion blinds sold for home use and provided in the same shades, colors and styles of wood grain, plastic, vinyl, cloth or the like to match with furniture or ornamental decor.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A pet bowl lift apparatus supportable upon a ground surface for selectively elevating at least one pet food bowl from a ground level to an elevated level, the pet food bowl lift apparatus comprising:

a tray configured to selectively retain said at least one pet food bowl, the tray including:

an upper, horizontally-oriented platform having a first perimeter and at least one opening sized and shaped to seat said at least one pet food bowl therein, such that a peripheral flange of said at least one pet food bowl is supported upon a top surface of said tray upper platform and a main body of said at least one pet food bowl depends downwardly through said at least one opening;

a lower, horizontally-oriented platform having a second perimeter, matching the first perimeter of said upper platform, spaced-apart from said upper platform and having a first part of a tray alignment system integrated into a bottom surface thereof, the lower platform having an opening provided therethrough; and a vertically-oriented perimeter wall adjoining the matching first and second perimeters of the respective upper and lower tray platforms, the upper platform, the lower platform and the perimeter wall, together, defining a tray interior cavity;

a lift mechanism supported upon said ground surface, the lift mechanism including:

a horizontally-oriented lower base plate;

a horizontally-oriented upper plate configured for detachably supporting said tray upon and above said lift mechanism in a manner preventing said tray from horizontal, sliding movement with respect to said upper plate, said horizontally-oriented upper plate being non-pivotable from said horizontal orientation when said pet bowl lift apparatus is in a fully-assembled, operational state; and a scissor lift assembly interposed between, and adjoining, said lower base plate and said upper plate, said scissor lift assembly incorporating a lift control mechanism for enabling selective adjustment of an elevation of said horizontally-oriented upper plate between said ground level, when the lift mechanism is in a collapsed state, and an elevated level when the lift mechanism is in a non-collapsed, extended state, said horizontally-oriented upper plate maintained in said horizontal orientation in both said collapsed and extended states; and an outer, accordion-style pleated casing releasably-attached at an upper end thereof to the perimeter wall of said tray, and attached at a lower end thereof to the lower base plate of said lift mechanism, the outer casing surrounding and concealing said lift mechanism while said scissor lift assembly is in either one of said collapsed and extended states.

2. The apparatus of claim 1 wherein said lift mechanism further comprises:

a second part of the tray alignment system integrated into said lift mechanism upper plate, the second part of the tray alignment system releasably-engageable with the first part of the tray alignment system, wherein said releasably-engageable first and second parts of the tray alignment system prevents said horizontal, sliding movement of said tray with respect to said lift mechanism upper plate.

3. The apparatus of claim 2 wherein the respective first and second parts of the tray alignment system of said lift mechanism further comprise:

a plurality of pegs extending from one of a bottom surface of said lower tray platform and a top surface of said lift mechanism upper plate; and a corresponding plurality of peg-receiving apertures extending into at least one of said bottom surface of said lower tray platform and said top surface of said lift mechanism upper plate.

4. The apparatus of claim 1 wherein the tray perimeter wall of said apparatus further comprises:

a perimeter wall upper edge protruding upwardly a distance beyond a top surface of said tray upper platform to define a continuous lip protruding upwardly from said upper platform top surface to define a barrier edge, wherein the barrier edge functions to retain food or water spillage from said at least one pet food bowl upon the top surface of the tray upper platform.

5. The apparatus of claim 1 wherein said tray further comprises:

a pair of tray lifting handles extending upwardly from an upper edge of said perimeter wall.

6. The apparatus of claim 4 wherein said tray further comprises:

a pair of tray lifting handles extending upwardly from the upper edge of said perimeter wall.

7. The apparatus of claim 1 wherein said tray interior cavity has a depth adequately sized for containing said main body of said at least one pet food bowl therein when said at least one pet food bowl is seated in said at least one opening of said upper tray platform.

8. The apparatus of claim 1 wherein the lift control mechanism further comprises:

a gear box supporting a lower base connector on said lower base;

a reversible drive motor supported by said gear box adjacent to said lower base connector;

an elongated drive screw supported by said gear box adjacent to said lower base connector and said reversible drive motor, said elongated drive screw at one end drivingly connected to said reversible drive motor and extending therefrom to an opposite end threadably connected to a lower guide shoe on said lower base such that actuation of said reversible drive motor causes reversible rotation of said elongated drive screw relative to said lower guide shoe and thus reversible horizontal movement of said lower guide shoe along and relative to a lower guide track on said lower base, thereby enabling reversible vertical movement of said scissor lift assembly between said collapsed and extended states; and a remote control device in communication with said reversible drive motor, thereby enabling an operator of said pet bowl lift apparatus to remotely elevate said at least one pet food bowl.

9. The apparatus of claim 8 further comprising:
an upper guide track protruding from a bottom surface of the upper plate of said lift control mechanism; and
an upper guide shoe pivotably coupled with an upper end connector of said scissor lift assembly, wherein the upper guide shoe is disposed in a horizontal sliding engagement with the upper guide track.

10. A pet bowl lift apparatus supportable upon a ground surface for selectively elevating at least one pet food bowl from a ground level to an elevated level, the pet food bowl lift apparatus comprising:
a tray configured to selectively retain at least one pet food bowl, the tray comprising
an upper platform having at least one opening sized and shaped to fixedly seat said at least one pet food bowl therein;
a lower platform spaced-apart from said upper platform and having a first part of a tray alignment system integrated into a bottom surface thereof, the lower platform having an opening provided therein; and
a vertically-oriented perimeter wall adjoining aligned, matching perimeters of said upper and lower platforms, the upper platform, the lower platform and the perimeter wall, together, defining a tray interior cavity;
a lift mechanism comprising
an upper plate horizontally-oriented and disposed below said tray and detachably supporting said tray when said pet bowl lift apparatus is in a fully assembled and operable state,
a lower base positioned below and spaced-apart from said upper plate, and resting on said ground surface, and
a scissor lift assembly interposed between, and adjoining, said lower base and said upper plate of said lift mechanism, said scissor assembly comprising
a pair of upper ends,
a pair of upper end connectors each laterally spaced from the other and disposed on a respective one of said pair of upper ends, said upper end connectors pivotally coupled to and supporting said upper plate,
a pair of lower ends, and
a pair of lower end connectors each laterally spaced from the other and engaging a respective one of said pair of lower ends, said lower end connectors pivotally coupled to and supported upon said lower base such that said scissor lift assembly is operable to vertically translate said upper plate toward and away from said lower base;
a lift control mechanism operable for actuating said scissor lift assembly to vertically translate said upper plate, and said tray therewith, relative to said lower base, between a fully raised elevation to enable a person to remove and replace said tray without having to bend, and a plurality of lowered elevations below said fully raised elevation to facilitate pet access to said at least one pet food bowl, the plurality of lowered elevations corresponding to varying pet sizes, wherein, during operation, said upper end connectors pivotally coupled to and supporting said upper plate restrict pivoting movement of said upper plate from said horizontal orientation; and an outer, accordion style tubular casing releasably-attached at an upper end thereof to the perimeter wall of said tray, and attached at a lower end thereof to the lower base plate of said lift mechanism, the outer tubular casing surrounding and concealing said lift mechanism while said scissor lift assembly is at ground level, in a collapsed state, and at the varying elevations above said ground level, while said scissor lift assembly is in at least a partially extended state, as said outer tubular casing is vertically stretched between a fully-extended state and a recoiled state to accommodate said tray being disposed at the correspondingly raised and successively lowered elevations above and at ground level.

11. The apparatus of claim 10 wherein said lift control mechanism includes a wireless device configured to remotely control operation of said scissor lift assembly.

12. The apparatus of claim 10 wherein said scissor lift assembly further comprises:
a first plurality of paired parallel legs pivotally coupled together end-to-end by first connectors; and
a second plurality of paired parallel legs pivotally coupled together end-to-end by second connectors;
wherein said first and second pluralities of paired parallel legs are separately arranged in respective zigzag configurations that crisscross, and inter-fit with, one another and are pivotally coupled together by middle connectors located midway between opposite ends of said paired parallel legs such that said inter-fitting and pivotally coupled first and second pluralities of paired parallel legs provide a scissoring action when the scissor lift assembly undergoes vertical extension between said collapsed and extended states; and
wherein said first, second and middle connectors define respective pivotal axes that extend parallel to one another.

13. The apparatus of claim 10 wherein said lift mechanism further comprises:
an upper plate connector disposed upon a bottom of said upper plate adjacent to a first side edge of said upper plate and pivotally coupled with a first one of said pair of upper end connectors of said scissor assembly;
a linear upper guide track disposed upon said bottom of said upper plate and laterally spaced apart from said upper plate connector, said linear upper guide track extending adjacent to, and perpendicular to, a second side edge of said upper plate opposite said first side edge of said upper plate; and
an upper guide shoe pivotally coupled with a second one of said pair of upper end connectors of said scissor lift assembly, said upper guide shoe disposed in a horizontal sliding engagement with said upper guide track to enable horizontal sliding movement of one of said pair of upper ends of said scissor lift assembly along said upper guide track to thereby accommodate vertical extension of said scissor lift assembly between said collapsed and extended states.

14. The apparatus of claim 10 wherein said lift mechanism further comprises:
a lower base connector disposed upon a top of said lower base adjacent to a first side edge of said lower base, and pivotally coupled with a first one of said pair of lower end connectors of said scissor lift assembly;
a lower guide track disposed upon said top of said lower base laterally spaced apart from said lower base connector and extending adjacent, and perpendicular, to a second side edge of said lower base opposite said first side edge of said lower base; and a lower guide shoe pivotally coupled with a second one of said pair of lower end connectors of said scissor lift assembly, said lower guide shoe disposed in a horizontal sliding engagement with said lower guide track to enable horizontal sliding movement of a corresponding second one of said pair of lower ends of said scissor lift assembly along said lower guide track and thereby enable vertical extension of said scissor lift assembly between said collapsed and extended states.

15. The apparatus of claim 10 wherein said lift control mechanism further comprises:

a gear box supporting said lower base connector on said top of said lower base;

a reversible drive motor supported by said gear box adjacent to said lower base connector; and an elongated drive screw supported by said gear box adjacent to said lower base connector and said reversible drive motor, said elongated drive screw at one end drivingly connected to said reversible drive motor and extending therefrom to an opposite end threadably connected to said lower guide shoe on said lower base such that actuation of said reversible drive motor causes reversible rotation of said elongated drive screw relative to said lower guide shoe and thus reversible horizontal movement of said lower guide shoe along, and relative to, said lower guide track on said lower base, thereby enabling reversible vertical translation of said scissor lift assembly between said collapsed and extended states.

* * * * *